United States Patent Office 2,698,787
Patented Jan. 4, 1955

2,698,787

UREA-FORMALDEHYDE RESINS FOR WET STRENGTH PAPER AND THEIR USE

Arthur M. Schiller and Tzeng Jiueg Suen, Stamford, Conn., assignors to American Cyanamid Company, New York, N. Y., a corporation of Maine No Drawing. Application December 17, 1951,
Serial No. 262,168

8 Claims. (Cl. 92—3)

The present invention relates to novel cationic, hydrophilic, resinous reaction products of formaldehyde, urea, and a mono-substituted urea containing an aminoalkyl radical in the substituent group thereof and having the following formula:

wherein $n$ is an integer from 2 to 4, $m$ is an integer from 1 to 4, and R is a substituent selected from the group consisting of hydrogen and alkyl and hydroxyalkyl groups containing 1 to 2 carbon atoms, the said mono-substituted urea being hereinafter referred to as an (aminoalkyl) urea inasmuch as it contains at least one aminoalkyl radical [—$(CH_2)_nNH$—] in the substituent group thereof. These novel cationic resins are water-soluble and water-dispersable and are useful for various purposes. They are substantive to cellulosic fibers in aqueous medium and are particularly useful for imparting wet strength to waterlaid felts prepared from those fibers.

This invention also comprises methods of preparing these novel cationic, cellulosic-substantive, water-dispersable, resinous condensation products wherein the formaldehyde is reacted with the urea and said monosubstituted urea in an aqueous medium, first at an alkaline pH and then at an acid pH, to form a resinous syrup containing the water-soluble, cationic resins of this invention. Thus, it includes such novel methods and the new resins so obtained.

The present invention further comprises processes of making paper and like waterlaid cellulosic felts having improved wet strength wherein these novel, water-dispersable, cationic, cellulose-substantive resins are applied to cellulosic fibers in aqueous medium, the so-treated fibers are formed into waterlaid sheets and the felts so obtained are heated to dry the same and cure the resin, in situ, therein. It also comprises the waterlaid cellulosic felts having improved wet strength so obtained.

It has long been known that a paper of increased wet tensile and bursting strengths can be prepared by impregnating a preformed paper felt or web with a strong solution of urea-formaldehyde resin. When the thus-impregnated web is dried and the resin cured, a strong sheet is obtained in which the paper fibers are bonded by the cured resin. The product differs from ordinary paper in several undesirable respects. In the first place, the resulting sheet possesses a folding strength very much less than that of even ordinary paper, most likely due to the cutting action of sharp abrasive edges which are formed when the resin impregnant is broken during the testing. Then the sheet is comparatively stiff and harsh, and does not possess the absorbency, softness, openness of texture or flexibility characteristic of ordinary paper. Moreover, in the process there is the disadvantage that the paper must be dried twice; once to prepare the felt for impregnation, and once to cure the resin on the impregnated felt.

To form a paper possessing in combination the property of wet strength and the desirable characteristics of ordinary paper, it is necessary to deposit the resin uniformly and evenly over the length of the individual paper fibers in such a way that strong bonds are formed predominantly at the points where the fibers in the felt meet and cross. Experience has demonstrated that this method of deposition can be effected provided two conditions exist. In the first place the fibers must be more or less freely suspended in a dilute aqueous medium, for example, in the beater of a paper machine. In the second place, the resin must be present either in the form of a solution or as a very fine colloidal dispersion, as it has not been found possible to deposit the resin in the form of large aggregates to yield the combination of effects desired.

The water-soluble condensation product formed by reacting urea with formaldehyde, referred to above, has long been known as one of the least costly synthetic resins and has been proposed as a wet strength additive to paper stock. It was found, however, that the molecules of this condensate lack the property of substantivity to paper fibers, and that in fact sufficient of this resin cannot be deposited even by the use of a precipitant to yield a satisfactory wet strength paper.

The present invention is based upon the discovery that when the condensation of urea with formaldehyde is performed in the presence of even a very minor proportion of an (aminoalkyl) urea, the reaction may be carried beyond the point at which the urea-formaldehyde condensate otherwise would become insoluble. It has been discovered that when a critical proportion of (aminoalkyl) urea is present, the condensation may be continued without danger of precipitation in the flask or the formation of a water-insoluble condensate, to a point well within the stage at which the resin develops strongly cationic and cellulose-substantive properties. Surprisingly, it has been found that even a molar quantity of (aminoalkyl) urea as little as 1/50 that of urea produces a resin which when incorporated into paper fibers affords a soft, highly absorbent paper of excellent wet strength and bursting strength. It is a particular advantage that the resins of the present invention do not require the use of precipitating agents for their application, and that they exhibit their improved characteristics without the sacrifice of the other qualities required of a substantive wet strength resin suitable for addition to paper fibers in the beater.

The mono-substituted ureas, namely, the aminoalkyl ureas, used in preparing the novel cationic resins of this invention may be represented generically by the following formula

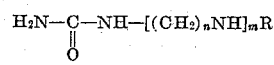

where $n$ is an integer from 2–4, $m$ is an integer from 1 to 4, and R is H or an alkyl or a hydroxyalkyl group of 1–2 carbon atoms. The aminoalkyl groups set forth in this formula include the —$CH_2CH_2$—$NH_2$ group, —$CH_2CH_2$—NH—$CH_2CH_2NH_2$ group, the

—$CH_2CH_2$—NH—$CH_2CH_2NHC_2H_4OH$ group, and the

—$CH_2CH_2NH$—$CH_2CH_2NH$—$CH_2CH_2NHCH_2CH_2NH_2$ group. These ureas may be prepared by known means. One such method is disclosed in U. S. Patent 2,253,528 to John F. Olin. According to this method, the appropriate polyalkylene-polyamine or N-hydroxyalkyl polyalkylene-polyamine is reacted with urea directly at an elevated temperature. The desired substituted urea is formed with evolution of ammonia. In this manner diethylenetriamine, tetraethylenepentamine, triethylenetetramine, N-2-hydroxyethyl-diethylenetriamine and similar amines may be reacted with urea to form substituted ureas falling within the formula given above.

Briefly, according to the present invention, a resin is prepared from urea, one or more of the above described (aminoalkyl) ureas and formaldehyde by reacting these materials at an elevated temperature. First the reaction is conducted at an alkaline pH until the formation of methylol ureas is substantially complete. The reaction mixture is then acidified and the reaction continued until a cationic, cellulose-substantive resin has formed which is a homogeneous interpolymer of the several methylol ureas. Heating is then terminated and the resin stabilized by adjusting its pH to neutrality. The resin may be added to the stock directly. Preferably, however, the resin will be diluted to 10% solids content with water to facilitate metering. It is then admixed with a slurry of cellulose fibers. Under these conditions the resin is rapidly adsorbed by the fibers. A soluble acidic curing catalyst is added if necessary, and the thus treated fibers are felted and dried in the normal way.

It is a particular advantage of the present invention that manipulatively the formation and application of the resin follows customary procedures, and that no special techniques or apparatus are necessary.

In the resinification reaction, the temperatures employed are those which are usual for the condensation of formaldehyde with urea alone. During the initial or alkaline reaction temperatures between about 40° C. and the reflux point may be used, but the intermediate range of 50° C. to 75° C. is preferred, as in this range the reaction takes place rapidly, yet can be controlled easily. The alkaline reaction is exothermic, and normally formation of the methylol ureas is complete when the evolution of heat subsides. The subsequent reaction on the acid side can be carried out at any temperature at or below reflux, and even at room temperature. However, the optimum range is about 40° C.–70° C. The end point is determined by the use to which it is intended that the resin shall be put. When it is intended to add the resin to cellulose fibers to produce wet strength paper, the reaction is continued at least until the resin syrup becomes viscous enough to be substantive to cellulose fibers in water dispersion. This point can be readily ascertained by routine laboratory tests. Ordinarily this point, which is a measure of the average size of the resin molecules, is reached when a syrup at about 40% solids content has developed a viscosity of 25° C. above A on the Gardner-Holdt scale. The reaction, and therefore the growth of the resin molecules, may be continued until the viscosity has risen to Z or even further, if desired, so long as it is not carried beyond the point where the resin gels. Where the resin is intended for application to textiles, a resin of somewhat lower viscosity is advantageous.

The molar ratio of formaldehyde to the total urea, that is to the mols of urea and (aminoalkyl)urea employed, should be between 1.8:1 and 4.0:1 and preferably is in the range of 2.0:1 and 3.0:1.

The lowest molar ratio of the (aminoalkyl)urea to urea at which we have found the benefits of the present invention to become distinctly noticeable are 0.02:1. A higher proportion of the (aminoalkyl)urea may advantageously be employed. For example, the ratio may be as high as a 1:1. The higher ratios, however, are not preferred as they require increased proportions of the more costly substituted ureas. It is preferred to use ratios falling near the lower limit, that is, ratios of about 0.03:1 to 0.3:1, as these ratios minimize the consumption of the (aminoalkyl)urea while affording a cationic resin which is freely soluble in water and very substantive to cellulose.

The exact method of effecting the formation of the methylol ureas is not critical. Ordinarily the procedure will follow that recited above. If desired, however, the reaction of urea with its proportionate part or all of the formaldehyde may be performed first, and the (aminoalkyl)urea may be added later with any formaldehyde remaining, or vice versa.

The initial reaction between the formaldehyde, the urea, and the (aminoalkyl)urea is performed on the alkaline side preferably below pH 10, and may be performed at the neutral point. The subsequent reaction on the acid side is advantageously performed within the pH range of 2 to 6. Adjustment of the pH within these ranges may be performed by the addition of any sufficiently strong acid or base, for example, sodium hydroxide, potassium hydroxide, sodium carbonate, triethylamine, or triethanolamine on the one hand and hydrochloric acid, sulfuric acid or formic acid on the other.

The reaction products are straw-colored syrups typically containing about 40% solids when 37% formalin is used in the ratio of about 2.2 mols of formaldehyde to 1 mol of the ureas. They are stable at a pH of about 7 or slightly above at room temperature for at least several weeks, freely soluble in water, cationic in nature, and strongly substantive to cellulose fibers in the beater.

The resin is primarily useful for application to cellulosic fibers to form wet strength paper for use as paper toweling, wrapping paper, newsprint, bag paper, and map paper. The resin may also be used, however, as a thermosetting adhesive particularly useful for laminating paper and wood, as a shrink- and creaseproofing resin for textiles, and as a plumping agent for leather.

The application of this resin to an aqueous suspension of cellulose fibers is ordinarily performed according to the general method known in the art for this step. Preferably the pulp is well hydrated as this promotes speeds of adsorption and increases the adsorptive capacity of the fibers. The consistency of pulp is not critical. Ordinarily it is 1% but the resin may be successfully applied at consistencies of 0.1% or lower. It is immaterial whether the pulp is acid or alkaline during the addition of the resin, as the resin is rapidly adsorbed with the pulp in either condition. An acid catalyst is necessary to promote the cure of the resin, however, and therefore the pH of the stock should be reduced to below 7 at a suitable point preferably before the web is formed and the fiber felted. This may be done by adding an acid, preferably hydrochloric acid, with or without a buffer such as alum to the stock in the beater or headbox. The final preferred pH is between 4 and 6.

The resin is cured by heating the dried felt at 150° C. for about 5 seconds or at 100° C. for about 10 minutes. These temperatures are not critical as the resin when applied will cure even at lower temperatures, a correspondingly longer curing time, however, being necessary.

A paper of markedly improved wet strength is obtained when as little as 0.25% resin is adsorbed based on the dry weight of the fibers, so that there appears to be no bottom critical limit to the amount of resin which must be added to obtain some beneficial results. The maximum amount which need be added, of course, corresponds to the adsorptive capacity of the fibers for the resin, typically about 10% based on the weight of the dry fibers. The optimum amount of resin which should be added to produce paper of maximum wet strength is a variable which depends in each instance upon the degree of hydration of the pulp, the proportion of fiber fines, the purity of the pulp, the type or quality of the pulp, and the concentration of anions and cations in the stock. As a result, the optimum proportion for each stock can be found only by experimentation. Ordinarily, however, the adsorption of between 1% and 3% of resin, based on the dry weight of the paper fibers in the stock, gives a paper of very satisfactory wet strength. Further amounts may be added, but a point is reached where the adsorption of successive increments of resin becomes lower and lower approaching zero when the adsorptive capacity of the fibers for the resin is substantially satisfied. In this latter range, some resin may remain in the white water. This unadsorbed resin need not go to waste as it is readily feasible to circulate the white water and to reuse the resin content thereof in the treatment of further batches of pulp.

The application of the present resin to paper is not limited to the beater addition method, described above. On the contrary, the resin may also be applied by the tub method if desired. Thus a preformed paper web, sufficiently dried to render it self-supporting, is immersed in a 1% to 10% aqueous solution of the resin at a distinctly acid pH to up to 100% of resin based on the weight of the paper may be picked up in this way. The paper is then heated for about 1–4 minutes at 210–300° F. or higher. The resulting sheet has greatly increased wet strength.

The invention has been described above. The following examples, which set forth specific embodiments, are presented to illustrate the application of the invention and are not to be construed in limitation thereof. Parts are by weight unless otherwise noted.

*Example 1*

54 parts of urea (0.9 mol), 178 parts 37% formalin (2.2 mols), and a solution of 14.6 parts of N-[2-(2-aminoethylamino)ethyl]urea (0.1 mol)

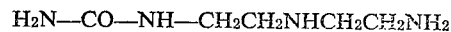

dissolved in 25 parts of water are placed in a reaction vessel provided with reflux column, stirrer, and thermometer. The mixture is warmed to dissolve all the reagents, the pH adjusted to 8.5 by the addition of aqueous NaOH, and the mixture heated at 70° C. for 30 minutes. The pH is then reduced to 2.6 with concentrated hydrochloric acid and heating continued until the viscosity at 25° C. and 40% solids is H as measured by the Gardner-Holdt tube method. The pH is then adjusted to 7 with dilute NaOH and the solution cooled. A sample of the product thus prepared remained stable for over 3 months at room temperature.

*Example 2*

Six hundred parts of urea (10 mols) and 2030 parts of 37% aqueous formaldehyde (25 mols) are mixed together and the pH of the solution is adjusted to about 8 with triethanolamine. It is warmed to 70° C. and kept at 70°–80° C. for 20 minutes. Seventy parts of $N^1$-carbamyltetraethylenepentamine $$NH_2-CO-NH-(CH_2CH_2NH)_4H$$

(0.3 mol) is added and the pH of the reaction mixture is lowered to about 3.5 with hydrochloric acid. Further reaction is carried out at 70°–75° C. for 15 minutes and at 50°–55° C. for 2 hours. The viscosity of the resin syrup reaches a value of about K as measured by the Gardner-Holdt method at 25° C. and 40% solids. The cooled resin syrup is neutralized to a pH of 7.0 with dilute sodium hydroxide. It is soluble in cold water.

*Example 3*

Bleached kraft paper pulp is soaked in water for ½ hour, circulated in a beater for ½ hour, beaten for ½ hour at full load, and refined for two minutes in a Morden refiner. The consistency of the stock is reduced to 0.6% and its pH adjusted to 4.6 with concentrated HCl. The resin of Example 1 is diluted to 10% concentration with water, and an amount of resin is added to the stock equal in weight to 3% of the dry weight of the fibers in the stock. The resin-stock mixture was aged for 15 minutes and its pH then adjusted to 4.5. Hand sheets were prepared from the resulting stock at a basis weight of 47.5 (25" x 40"/500). One set of sheets was cured by heating for two minutes on a drum at 110° C. The wet strength of these sheets averaged 7.4 lbs. per inch. The wet strength increased to 9 when the second set of hand sheets was cured by heating in an oven at 260° F. for 10 minutes.

We claim:

1. As a process for the preparation of a resin syrup, useful for improving the wet strength of felted cellulosic fibers, from aqueous formaldehyde, urea and a mono-substituted urea containing an aminoalkyl radical in the substituent group thereof and having the following formula $$H_2N-CO-NH-[-(CH_2)_nNH-]_m-R$$

wherein $n$ is an integer from 2 to 4, $m$ is an integer from 1 to 4, and R is a substituent selected from the group consisting of H and alkyl and hydroxyalkyl radicals containing 1 to 2 carbon atoms, the process which comprises heating 1 mol of urea and 0.02 to 1 mol of the said mono-substituted urea with 1.8 to 4 mols of formaldehyde at a temperature between 40° C. and the reflux temperature of the aqueous reaction mixture at a pH of about 7 to about 10, until formation of methylol urea is substantially complete, acidifying the reaction mixture to a pH of about 2 to about 6, and further heating the so-acidified reaction mixture for a time sufficiently long to form a resinous reaction product which when adjusted to 40% solids exhibits a viscosity at 25° C. above A on the Gardner-Holdt scale and for a time insufficiently long to convert the resinous reaction product to the water-insoluble state.

2. The process of claim 1 wherein the molar proportion of the said mono-substituted urea to the urea is between 0.03:1 and 0.3:1.

3. As a new composition of matter, useful for improving the wet tensile strength of felts of cellulosic fibers, a water-soluble, cationic, resinous reaction product of 1.8 to 4 mols of formaldehyde with 1 mol of urea and 0.02 to 1 mol of a mono-substituted urea containing an amino-alkyl radical in the substituent group thereof and having the formula $$H_2N-CO-NH-[-(CH_2)_nNH-]_m-R$$

wherein $n$ is an integer from 2 to 4, $m$ is an integer from 1 to 4 and R is a substituent selected from the group consisting of H and alkyl and hydroxyalkyl radicals containing 1 to 2 carbon atoms, said water-soluble, cationic resinous reaction product being substantive to cellulosic fibers in aqueous medium and being obtained by the method of claim 1.

4. The composition of claim 3 wherein the molar ratio of the said mono-substituted urea to urea is between 0.03:1 and 0.3:1.

5. As a process of making cellulosic felts having improved wet strength and containing minor amounts of a water-insoluble, thermocured, resinous reaction product of 1.8 to 4.0 mols of formaldehyde with 1 mol of urea and 0.03 to 10 mols of a mono-substituted urea, uniformly distributed therein, said mono-substituted urea containing an aminoalkyl radical in the substituent group thereof and having formula $$H_2N-CO-NH-[-(CH_2)_nNH-]_m-R$$

wherein $n$ is an integer from 2 to 4, $m$ is an integer from 1 to 4, and R is a substituent selected from the group consisting of H and alkyl and hydroxyalkyl radicals containing 1 to 2 carbon atoms, the improved process which comprises adding to an aqueous suspension of cellulosic fibers an aqueous dispersion of the said resinous reaction product in uncured, water-soluble, cationic, cellulose-substantive form, absorbing on said fibers a weight of said resin equal to between 0.25% and 5% of the dry weight of said fibers, felting the so-treated fibers, drying the felted fibers and curing the resin, in situ, in the felt at about 100° C. to about 150° C. between about 10 minutes and about 5 seconds in the presence of an acidic catalyst therefor.

6. The process of claim 5 wherein the molar ratio of the said mono-substituted urea to urea is between 0.03:1 to 0.3:1.

7. A paper sheet of improved wet strength composed of waterlaid cellulosic fibers having uniformly distributed on the fibers from 0.25% to 5% by dry weight of a water-insoluble, thermocured resin cured, in situ, from a water-soluble, cationic resinous condensation product of 1.8 to 4.0 mols of formaldehyde with 1 mol of urea and 0.02 to 1 mol of a mono-substituted urea containing an amino-alkyl group and having the following formula $$H_2N-CO-NH-[-(CH_2)_nNH-]_m-R$$

wherein $n$ is an integer from 2 to 4, $m$ is an integer from 1 to 4 and R is a substituent selected from the group consisting of H and alkyl and hydroxyalkyl groups containing 1 to 2 carbon atoms.

8. A paper sheet according to claim 7 wherein the molar ratio of said mono-substituted urea to urea is between 0.03:1 and 0.3:1.

References Cited in the file of this patent

UNITED STATES PATENTS

| Number | Name | Date |
|---|---|---|
| 2,325,302 | Britt | July 27, 1943 |
| 2,338,602 | Schur | Jan. 4, 1944 |
| 2,340,046 | D'Alelio | Jan. 25, 1944 |
| 2,559,220 | Maxwell et al. | July 3, 1951 |
| 2,582,840 | Maxwell | Jan. 15, 1952 |
| 2,601,666 | Niles | June 24, 1952 |
| 2,657,132 | Daniel et al. | Oct. 27, 1953 |

FOREIGN PATENTS

| 616,429 | Germany | July 30, 1935 |